United States Patent [19]

Idleman

[11] Patent Number: 6,003,299
[45] Date of Patent: Dec. 21, 1999

[54] SYSTEM FOR MODULATING AIR FLOW THROUGH A GAS TURBINE FUEL INJECTOR

[75] Inventor: Dennis D. Idleman, Lakeside, Calif.

[73] Assignee: Solar Turbines, San Diego, Calif.

[21] Appl. No.: 08/979,596

[22] Filed: Nov. 26, 1997

[51] Int. Cl.[6] .................................. F02C 9/16; F23R 3/26
[52] U.S. Cl. ........................................ 60/39.23; 60/39.29
[58] Field of Search ................................. 60/39.23, 39.27, 60/39.29, 39.37, 740

[56] References Cited

U.S. PATENT DOCUMENTS

| | | | |
|---|---|---|---|
| 4,138,842 | 2/1979 | Zwick | 60/39.23 |
| 4,150,539 | 4/1979 | Rubins et al. | 60/39.23 |
| 4,545,196 | 10/1985 | Mongia et al. | 60/39.23 |
| 5,327,718 | 7/1994 | Iwata et al. | 60/39.27 |

*Primary Examiner*—Louis J. Casaregola
*Attorney, Agent, or Firm*—Larry G. Cain

[57] ABSTRACT

Gas turbine engines have in the past attempted to control emissions by a variety of processes or in a variety of manners. For example, past systems have used water or steam injection, and gas turbine combustion systems have utilized a variety of approaches including premix systems and various fuel injector designs. The present system controls emissions by modulating air flowing through a fuel injector. The system utilizes a fuel injector having a passage defined therein in which a valve is positioned. The valve is movable between a maximum flow position and a minimum flow position. The valve is moved lineal by a lineal movement portion being activated by a cam portion, a ring gear and an actuating mechanism. Parameters of the gas turbine engine are monitored by a plurality of sensors, and interpreted by a computer which actuates the actuating mechanism and results in the fluid flow to a combustor section being controlled to meet preestablished emission parameters.

17 Claims, 6 Drawing Sheets

Fig_2a_

SYSTEM FOR MODULATING AIR FLOW THROUGH A GAS TURBINE FUEL INJECTOR

DESCRIPTION

1. Technical Field

This invention relates generally to a gas turbine engines and more particularly to a system for modulating the air flow through an injector.

2. Background Art

The use of fossil fuel in gas turbine engines results in the combustion products consisting of carbon dioxide, water vapor, oxides of nitrogen, carbon monoxide, unburned hydrocarbons, oxides of sulfur and particulates. Of these above products, carbon dioxide and water vapor are generally not considered objectionable. In most applications, governmental imposed regulations are further restricting the remainder of the species, mentioned above, emitted in the exhaust gases.

The majority of the products of combustion emitted in the exhaust can be controlled by design modifications, cleanup of exhaust gases and/or regulating the quality of fuel used. For example, particulates in the engine exhaust have been controlled either by design modifications to the combustor and fuel injectors or by removing them by traps and filters. Sulfur oxides are normally controlled by the selection of fuels that are low in total sulfur. This leaves nitrogen oxides, carbon monoxide and unburned hydrocarbons as the emissions of primary concern in the exhaust gases emitted from the gas turbine engine.

The principal mechanism for the formation of oxides of nitrogen involves the direct oxidation of atmospheric nitrogen. The rate of formation of oxides of nitrogen by this mechanism depends mostly upon the flame temperature and to some degree upon the concentration of the reactants and, consequently, a small reduction in flame temperature can result in a large reduction in the nitrogen oxides.

Attempts to control NOx emissions by regulating the local flame temperature have adopted the use of water or steam injection. This system increases cost due to the additional equipment, such as pumps, lines and storage reservoir. Furthermore, in areas where a supply of water is not readily available the cost and labor to bring in water basically makes this option undesirable.

In an attempt to reduce NOx emissions without incurring increase in operational cost caused is by water or steam injection, gas turbine combustion systems have utilized a variety of approaches including premix systems and various fuel injector designs. These premix system and injectors used therewith are examples of attempts to reduce the emissions of oxides of nitrogen. The systems and injectors described above although improving the emissions of oxides of nitrogen emitted from the engine exhaust have failed to efficiently reduce emissions of oxides of nitrogen emitted from the engine exhaust.

The present invention is directed to overcome one or more of the problems as set forth above.

DISCLOSURE OF THE INVENTION

In one aspect of the invention, a control system is adapted for use with a gas turbine engine. The gas turbine engine defines a central axis which has a housing thereabout. A compressor section forms a fluid flow, a combustor section and a turbine section having a spent fluid flowing therefrom, each being operatively connected one to the other in a conventional manner are a part of the gas turbine engine. The control system is comprised of a plurality of sensors. A portion of the plurality of sensors are positioned in the spent fluid and sense a constituent of the spent fluid. An additional portion of the plurality of sensors are positioned within the gas turbine engine and sense a parameter of the gas turbine engine. A monitor is operatively connected to the plurality of sensors and receives a signal therefrom. The monitor interprets the signal. A plurality of fuel injectors are positioned within the combustor section. Each of the plurality of fuel injectors define a passage therein through which a portion of the fluid flow passed from the compressor section to the combustor section. A valve is positioned within the passage and is lineal movable between a maximum flow position and a minimum flow position. A plurality of lineal movement portions each define a first end portion and a second end portion. The second end portion is attached to the respective valve of the plurality of fuel injectors. Each of the plurality of lineal movement portions include a housing member interposed the first end portion and the second end portion, and is attached to the housing. A shielding member is positioned between the housing member and the valve near the second end portion and a follower mechanism is positioned at the extremity of the first end portion. A plurality of cam portions are connected to a respective one of the follower mechanism of the plurality of lineal movement portions. Each of the plurality of cam portions includes a rotating member having a cam profile and is operatively connected to a respective one of the follower mechanism of said plurality of lineal movement portions. A ring gear is connected to each of the plurality of cam portions. The ring gear actuates each of the plurality of cam portions simultaneously. An actuating mechanism is operatively connected to the monitor, receives a signal from the monitor, actuates the ring gear and lineally moves the respective valve between the maximum flow position and the minimum flow position.

BEST MODE FOR CARRYING OUT THE INVENTION

Referring to FIGS. 1, 2a, 2b, and 2c, a gas turbine engine 10 is shown having a recuperator 11 attached thereto. As an alternative, the gas turbine engine 10 need not have a recuperator 11 to maintain the jest of the invention. The gas turbine engine 10 includes a central axis 12 having a housing 14 defined about the central axis 12. The gas turbine engine 10 further includes a compressor section 16, a combustor section 18 and a turbine section 20 being operatively connected one to the other.

The compressor section 16 provides a fluid flow, designated by the arrows 24. A portion of the fluid flow 24 is supplied to the gas turbine engine 10 components and is used to cool a portion of the components, such as a portion of the combustor section 18 and the turbine section 20. And, another portion of the fluid flow 24 is supplied to the combustor section 18. The combustor section 18, in this application, includes an annular combustor, not shown. A plurality of fuel injectors 40 are positioned in the annular combustor in a conventional manner and supply a combustible fluid, not shown, to the annular combustor in a conventional manner. The plurality of fuel injectors 40 could be of either the gaseous or liquid type or of the dual fuel type. The combustible fuel and a portion of the fluid flow 24 are burned within the annular combustor and define a power fluid, designated by the arrows 42 exiting an outlet end portion of the annular combustor which drives the turbine section 20. The power fluid 42 exits the turbine section as an spent fluid flow or exhaust designated by the arrows 44. The plurality of fuel injectors 40 are equally spaced within the combustor section 18 about the central axis 12 of the gas turbine engine 10.

Since a portion of the fluid flow 24 going to the combustor section 18 passes through each of the plurality of fuel injectors 40, the gas turbine engine 10 further includes a control system 50 for modulating the fluid flow 24 through the plurality of fuel injectors 40. The control system 50 includes a mechanical actuator 52. A portion of the mechanical actuator 52 is positioned external of the housing 12 and a portion of the mechanical actuator 52 is positioned within the housing 14. The portion of the mechanical actuator 52 positioned within the housing 12 is operatively connected to the plurality of fuel injectors 40. The mechanical actuator 52 includes a plurality of actuators 54. Each of the plurality of actuators 54 is attached to a respective one of the plurality of fuel injectors 40. Each of the plurality of actuators 54 includes a cam portion 56, a support portion 58 and a lineal movement portion 60. The cam portion 56 transfers a rotational movement into a lineal movement and the lineal movement portion 60 extends the lineal movement to the respective one of the plurality of fuel injectors 40.

Figure 2A:
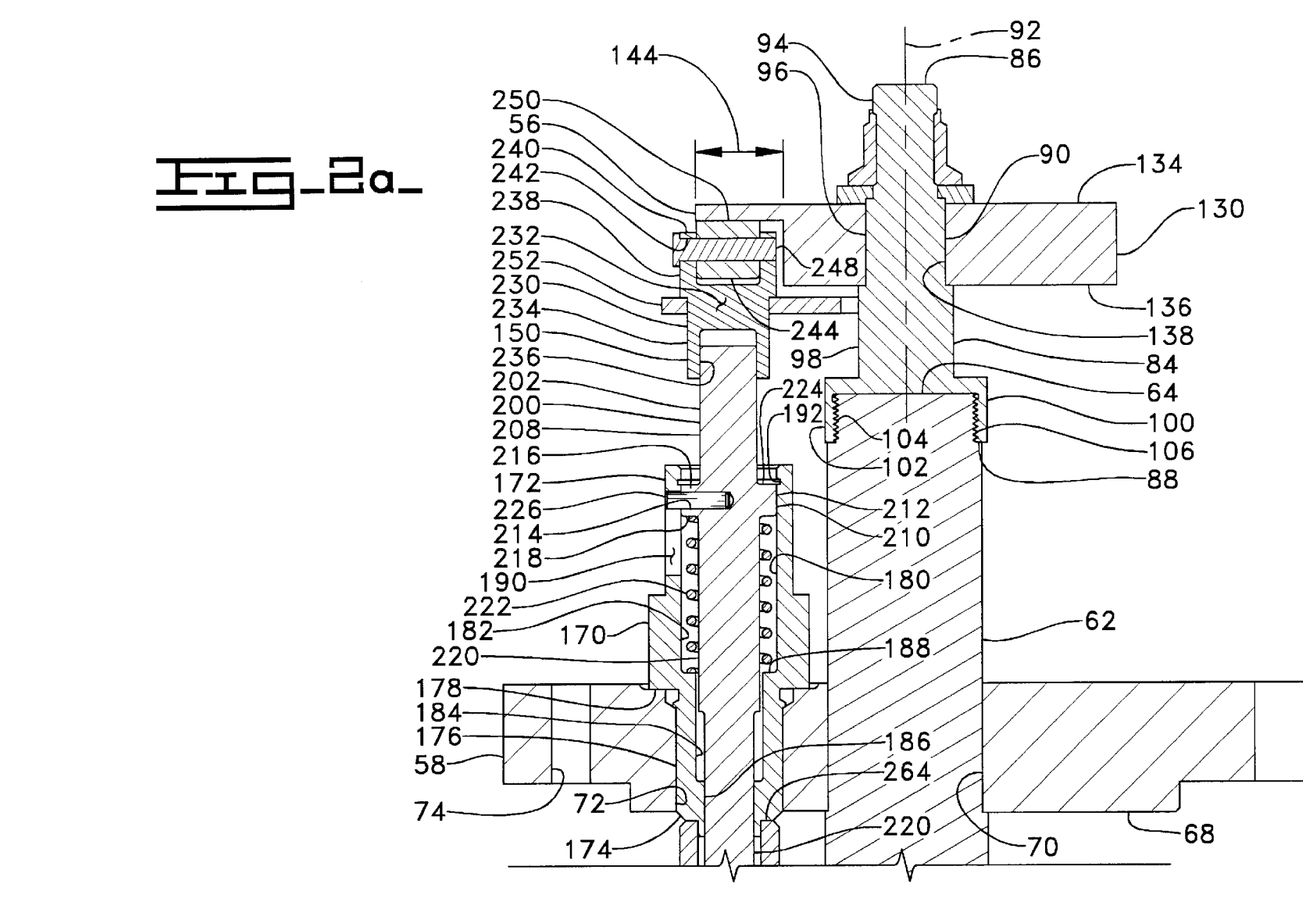
FIG. 2a is an enlarged elevational view of a portion of a control mechanism and a fuel injector as depicted in the present invention.
Figure 2B:
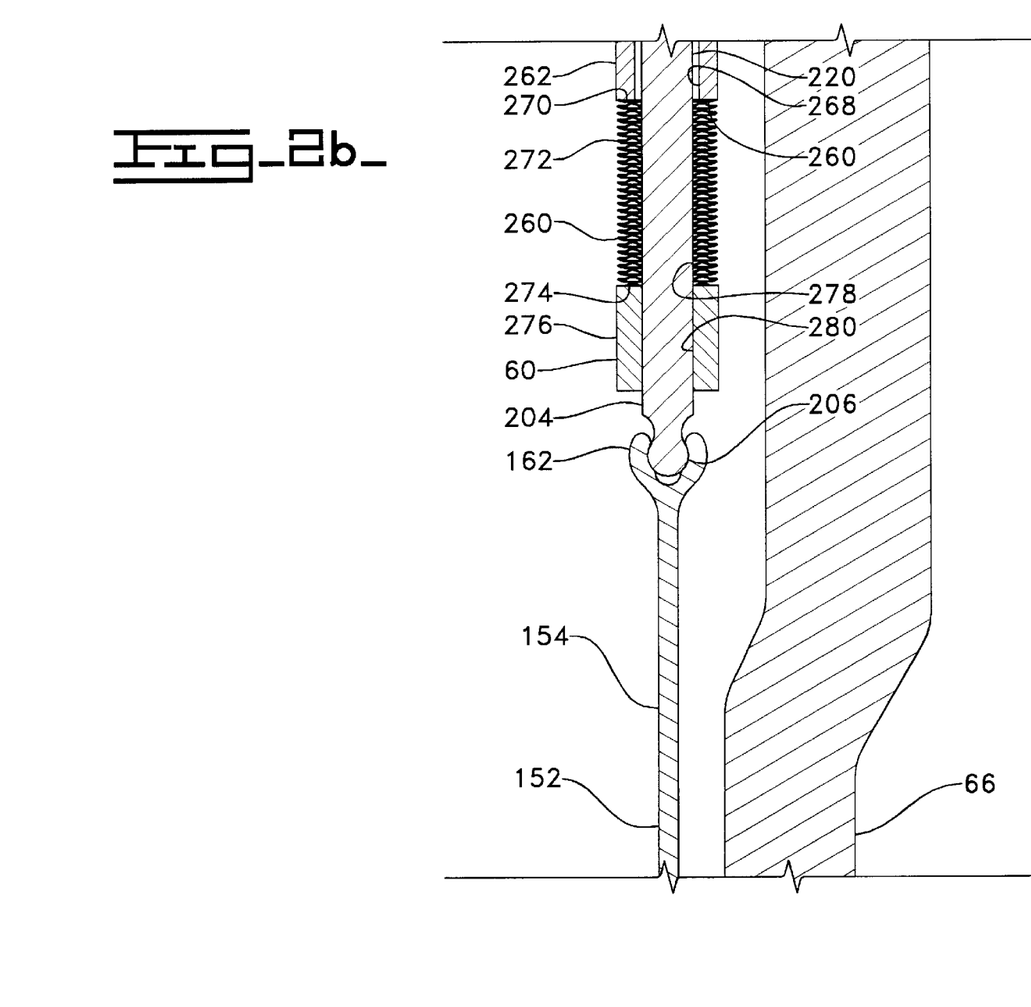
FIG. 2b is an enlarged elevational view of a portion of a control mechanism and a fuel injector as depicted in the present invention.
Figure 2C:
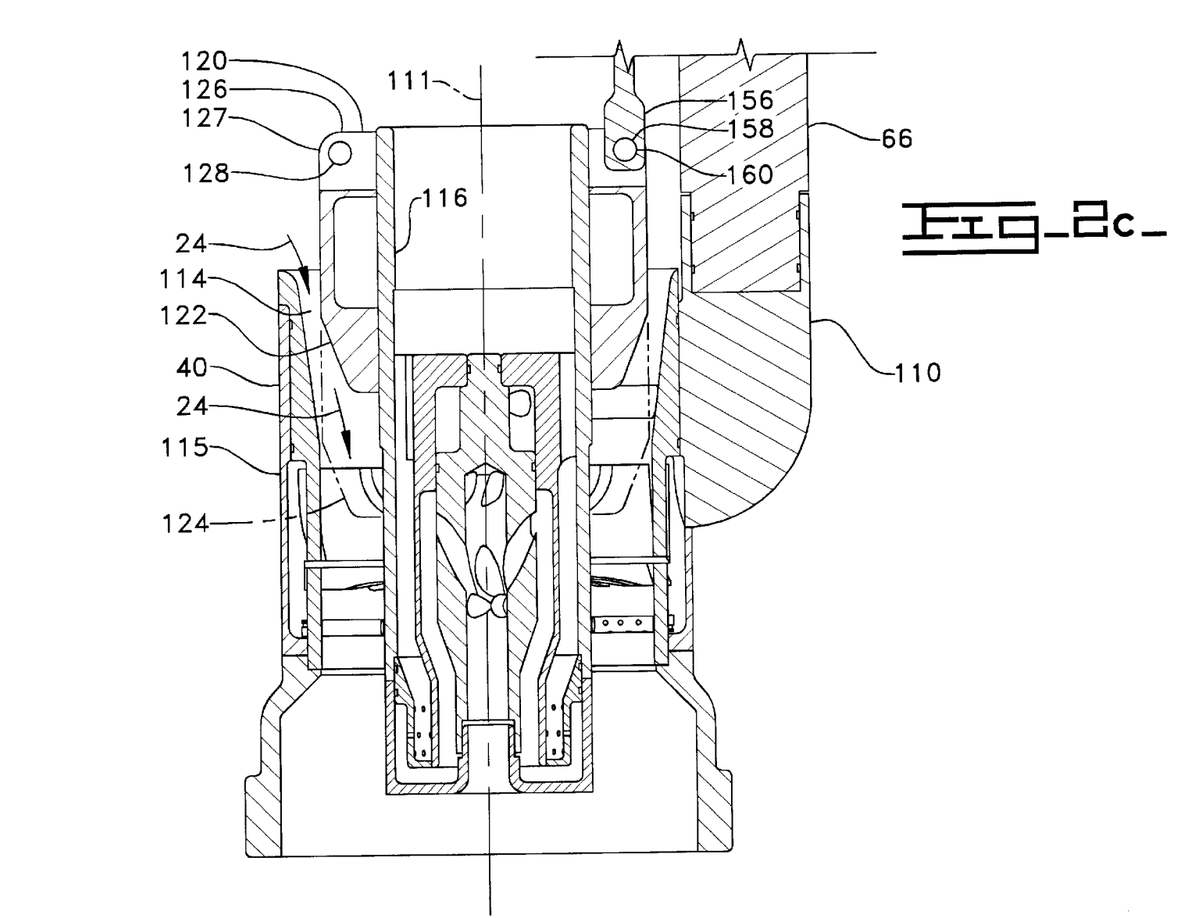
FIG. 2c is an enlarged elevational view of a portion of a control mechanism and a fuel injector as depicted in the present invention.

The support portion 58 includes a structural member 62 defining a first end portion 64 being connected to the cam portion 56 and a second end portion 66 attached to individual ones of the plurality of fuel injectors 40. Interposed the first end portion 64 and the second end portion 66 is a mounting plate 68. The mounting plate 68 defines a first opening 70 through which extends the structural member 62 and a second opening 72 through which extends the lineal movement portion 60. A plurality of holes 74 are positioned in the mounting plate 68 and correspond to a plurality of threaded holes 76 positioned about an opening, not shown, in the housing 12. A plurality of fasteners 80 secure the mounting plate 68 and each of the plurality of actuators 54 to the housing 12 and within the gas turbine engine 10.

The first end portion 64 of the structural member 62 has an adapter 84 attached thereto having a stepped configuration. For example, the adapter 84 defines a first end 86 and a second end 88. The adapter 84 has a generally cylindrical shape 90 defining an axis 92. Centered about the axis 92 and extending axially from the first end 86 is a first cylindrical portion 94 having a preestablished diameter, a preestablished length and a threaded configuration. Extending axially from the first cylindrical portion 94 toward the second end 88 is a second cylindrical portion 96 having a preestablished diameter being larger than the preestablished diameter of the first cylindrical portion 94 and a preestablished length. Extending axially from the second cylindrical portion 96 is a third cylindrical portion 98 having a preestablished diameter being larger than the preestablished diameter of the second cylindrical portion 96 and a preestablished length. Attached to the third cylindrical portion 98 is a flanged portion 100 defining a collar 102 having an internal thread 104 positioned therein. The internal thread 104 is removably attached to an external thread 106 positioned on the first end portion 64 of the structural member 62.

The second end portion 66 of the structural member 62 has a bracket 110 attached thereto. The bracket 110, in this application, is included as a portion of the individual plurality of fuel injectors 40 and supports each of the plurality of fuel injectors 40 within the gas turbine engine 10. Each of the plurality of fuel injectors 40 defines an injector axis 111 and include an air inlet end 112 having a passage 114 defined between an outer housing 115 and an inner housing 116 through which the portion of the fluid flow 24 passes through the fuel injector 40. The fluid flow 24 exits the fuel injector 40 and enters the annular combustor. Positioned within this passage 114 is a valve 120. The valve 120 is linearly movable along the injector axis 111 between a maximum flow position 122 and a minimum flow position 124. The valve 120 is operatively and controllably movable between each of the maximum flow position 122 and the minimum flow position 124. The valve 120, in this application, has a first end portion 126 being attached to the lineal movement portion 60 of each of the plurality of actuators 54. A tang 127 is formed on the first end portion 126 and has a hole 128 therein.

Figure 3:
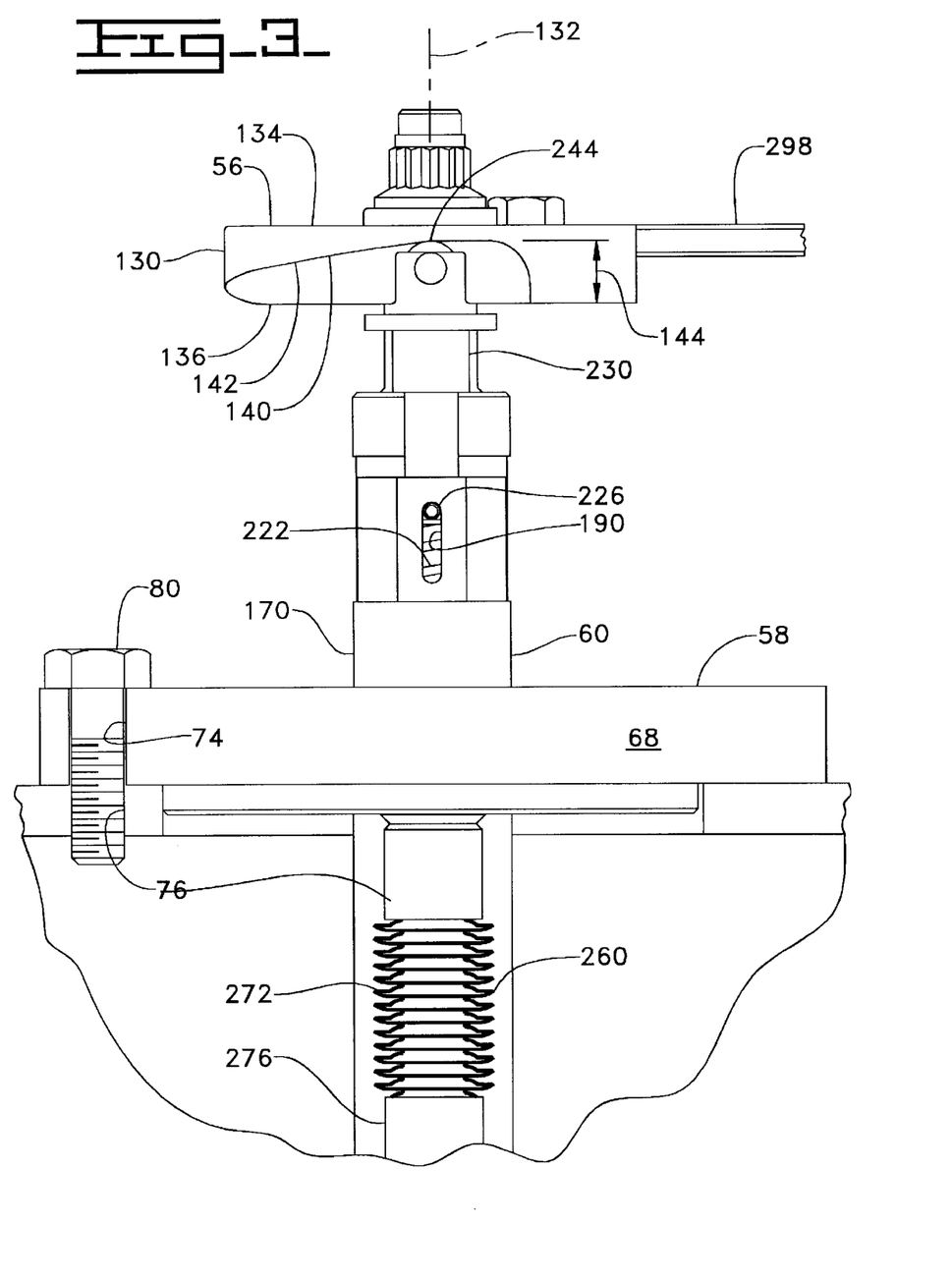
FIG. 3 is an enlarged elevational view of a portion of the control mechanism as depicted in the present invention.

As further shown in FIG. 3, the cam portion 56 includes a rotating member 130 defining an axis 132 being aligned with the axis 92 of the adapter 84. In this application, the rotating member 130 defines a first surface 134 and a second surface 136 being space apart. The first surface 134 and the second surface 136 are spaced apart a distance generally equal to the preestablished length of the second cylindrical portion 96. A bore 138 is positioned in the rotating member 130, extends between the first and second surfaces 134,136 and is in rotational relationship with the second cylindrical portion 96 of the adapter 84. Extending from the second surface 136 toward the first surface 134 is a cam profile 140 having a preestablished configuration. The cam profile 140 includes an arcuate profile 142 being recessed within the rotating member 130 a preestablished distance and further includes a preestablished depth 144.

The lineal movement portion 60 has a first end portion 150 being in contact with the rotating member 130. A second end portion 152 is attached to the first end portion 126 of the valve 120. The second end portion 152 includes a rigid member 154 defining a forked end 156 having a pair of holes 158 therein. A pin 160 is positioned within the pair of holes 158 and the hole 128 in the tang 127 of the first end portion 126 of the valve 120 and attaches the rigid member 154 and the valve 120. A spherical receiving end 162 is positioned at the end opposite the forked end 156 of the rigid member 154.

The lineal movement portion 60 further includes a housing member 170 defining a first end portion 172 and a second end portion 174. The bore 180 is parallel with the axis 132 of the cam portion 56. Intermediate the first end portion 172 and the second end portion 174 is an intermediate portion 176 positioned with the second opening 72 of the support portion 58. The first end portion 172 includes a shoulder 178 being larger that the second opening 72 and supports the position of the housing member 170 on the support portion 58. A bore 180 is positioned within the housing member 170 and extends from the first end portion 172 to the second end portion 174. The bore 180 has a stepped configuration including a larger diameter 182 positioned at the first end portion 172. An intermediate diameter 184 is positioned between the first end portion 172 and the second end portion 174. And, a small diameter 186 is positioned at the second end portion 174. A shoulder 188 is formed between the larger diameter 182 and the intermediate diameter 184. A slot 190 is positioned near the first end portion 172 and intersects with the larger diameter 182. The slot 190 has an elongate configuration defining an elongate portion 191 being parallel with the axis 132 of the cam portion 56 and the bore 180. A counterbore 192 is positioned in the larger diameter 182 near the first end portion 172. A shaft 200 is positioned in the bore 180 of the housing member 170.

The shaft 200 includes a first end portion 202 and a second end portion 204. The second end portion 204 defines a spherical end 206 and is attached to the spherical receiving end 162 of the rigid member 154. The shaft 200 has a stepped configuration. For example, the first end portion 202 has a first preestablished diameter 208 over a given length. A collar portion 210 extends from the first preestablished diameter 208 and is intermediate the given length. The collar portion 210 defines an outer surface 212 having a blind bore 214 therein. The collar portion 210 further defines a first abutting surface 216 adjacent the first end portion 202 of the shaft 200 and a second abutting surface 218 away from the first end portion 202 of the shaft 200. Extending between the first preestablished diameter 208 and the spherical end 206 is a second preestablished diameter 220. With the shaft 200 positioned within the bore 180 of the housing member 170, a spring 222 extends between the second abutting surface 218 and the shoulder 188. And, a snap ring 224 is positioned within the counterbore 192 and contacts the first abutting surface 216. A pin 226 extends within the slot 190 and is secured within the counterbore 214.

A follower mechanism 230 is positioned at the extremity of the first end portion 150 of the lineal movement portion 60. The follower mechanism 230 defines a body 232 having a collar portion 234 extending therefrom. The collar portion 234 has a bore 236 therein. The bore 236 is positioned about the first preestablished diameter 208 of the shaft 200. Extending from the end opposite the collar portion 234 of the body 232 is a yoked end portion 238. The yoked end portion 238 includes a pair of arms 240 being space apart. Each of the pair of arms 240 has a mounting hole 242 therein being aligned one to the other. A roller 244 is positioned between the arms 240. A bore 246 within the roller 244 has a pin 248 positioned therein and extending into the mounting holes 242 of the pair of arms 240. The roller 244 defines a rolling surface 250 being in contacting relationship with the arcuate profile 142 of the rotating member 130. The body 232 is supported by an arm 252.

Surrounding a portion of the second preestablished diameter 220 of the shaft 200 near the second end portion 204 is a shielding member 260. The shielding member 260 includes a first portion 262 having a first end 264 being connected to the housing member 170 at the second end portion 174. The first portion 262 of the shielding member 260 further includes a second end 266 and a clearance bore 268 extending from the first end 264 to the second end 266 which is slidably positioned about the second preestablished diameter 220 of the shaft 200. The second end 266 has a first end 270 of a heat dissipating member 272 attached thereto.

A second end 274 of the heat dissipating member 272 is attached to a sealing member 276. The heat dissipating member 272 defined an inner diameter 278 being slightly larger than the second preestablished diameter 220 of the shaft 200. And, the sealing member 276 also has an inner diameter 280 being slightly larger than the second preestablished diameter 220 of the shaft 200.

Figure 4:
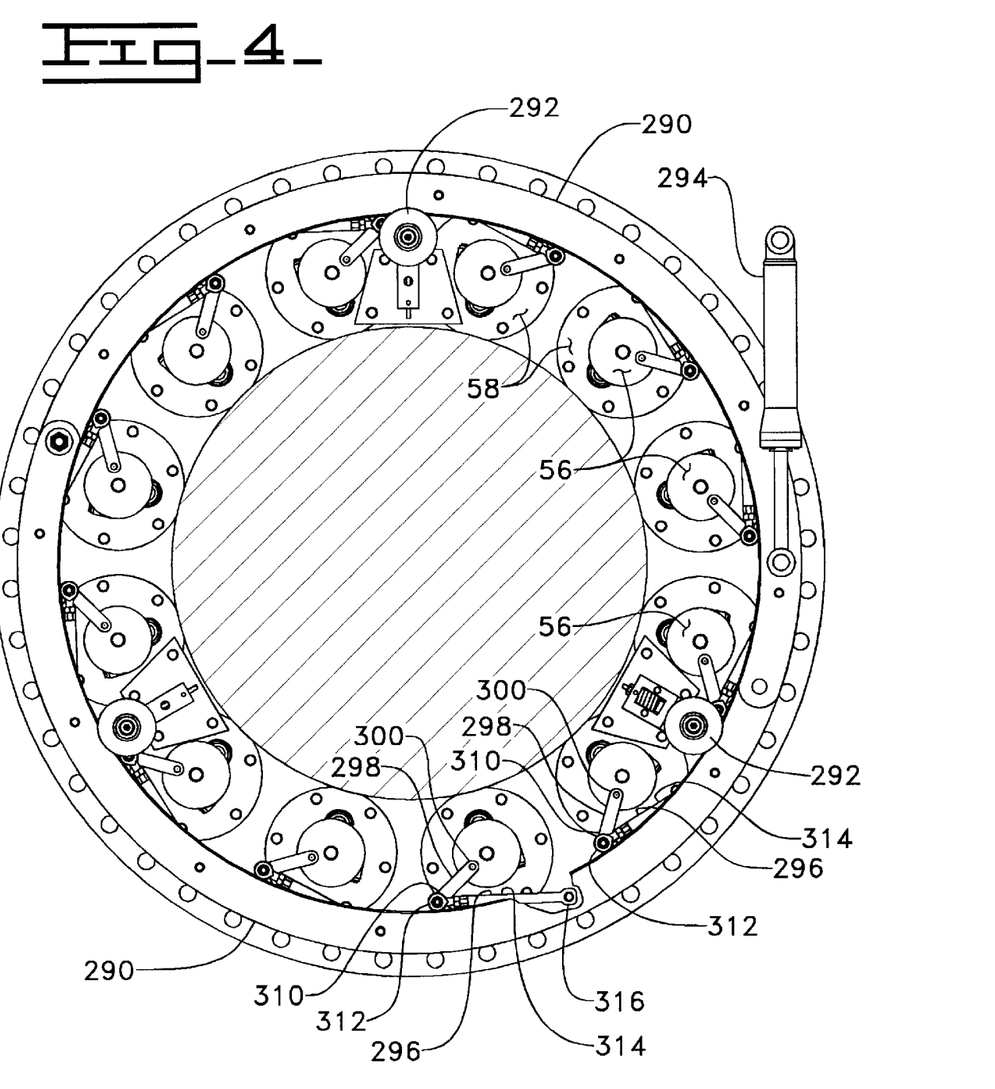
FIG. 4 is an enlarged elevational view of a portion of the control mechanism as depicted in the present invention, as taken along line 4—4 of FIG. 1.

In this application and best shown in FIG. 4, the portion of the mechanical actuator 52 positioned external of the housing 12 includes a ring gear 290. The ring gear 290 is mounting to the housing 12 by a plurality of roller members 292. For example, three roller members 292 are use in this application and center the ring gear 290 about the central axis 12. Furthermore, in this application, the ring gear 290 is made of two separate joined halves. Thus, a single actuating mechanism 294 can be used to rotate the ring gear 290. As an alternative, a plurality of actuating mechanism 294 could be use without changing the jest of the invention. The actuating mechanism 294 could be a hydraulic cylinder, a pneumatic cylinder or an electrically actuated device such as a solenoid. Each of the plurality of actuators 54 is attached to the ring gear 290 by a connecting mechanism 296. In this application, the connecting mechanism 296 includes a lever 298 having a first end 300 attached to the cam portion 56. A second end 310 of the lever 298 is attached to a first end 312 of an adjustable link 314. A second end 316, only one shown, of the adjustable link 314 is attached to the ring gear 290, in a conventional manner, such as by a pin.

Figure 1:
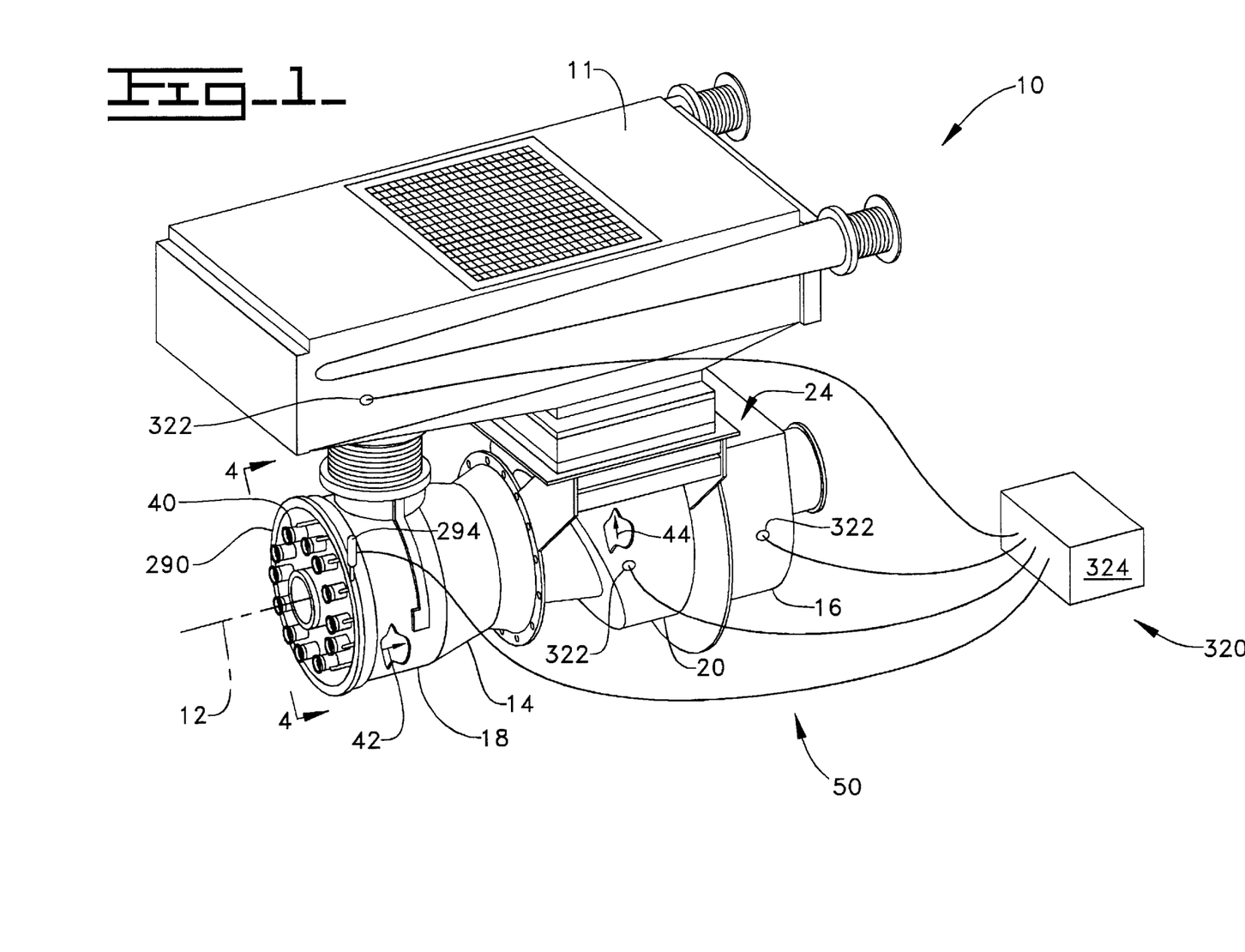
FIG. 1 is a partially sectioned side elevational view of a gas turbine engine embodying the present invention.

The control system 50 for modulating the fluid flow 24 within the plurality of fuel injectors 40 further includes a monitoring system 320. The monitoring system 320 includes a plurality of sensors 322 being operatively connected to a monitor or in this application a computer 324. A portion of the plurality of sensors 322 are positioned within the exhaust 44 and sense or monitor such items as NOx, CO and other exhaust emissions. Another portion of the plurality of sensors 322 are positioned within the gas turbine engine 10 and sense or monitor gas turbine engine 10 parameters such as temperature, speed, power or fuel demand. Signals are sent from the plurality of sensors 322 to the computer 324. The signals are interpreted by the computer 324 and a signal is sent to the actuating mechanism 294 in a conventional manner to cause the ring gear 290 to be rotated.

Other aspects, objects and advantages of this invention can be obtained from a study of the drawings, the disclosure and the appended claims.

INDUSTRIAL APPLICABILITY

In operation, the gas turbine engine 10 is started and operated to an operating temperature. The parameters of the operating gas turbine engine 10 are sensed by the plurality of sensors 322, directed to the computer 324 and interpreted against preestablished operating parameters Variation of the comparisons are compensated for by varying the fluid flow 24 through the plurality of fuel injectors 40. One such example is as follows. The emission of NOx in the exhaust 44 is determined to be too high and an adjustment in the fluid flow 24 through the plurality of fuel injectors 40 is determined to be needed. The signal from the computer 324 is directed to the actuating mechanism 294 and the ring gear 290 is rotated. The rotational movement of the ring gear 290 is transferred to the adjustable link 314 and to the lever 298. Thus, the rotating member 130 rotates about the axis 132. The rotation causes the arcuate profile 142 of the cam profile 140 to rotate the rolling surface 250 of the roller 244 along the cam profile 140. The arcuate motion is transferred into a lineal movement at the rolling surface 250 of the roller 244 as the rolling surface 250 moves along the profile 140. The resulting interface of the rolling surface 250 and the arcuate profile 142 causes a resulting force. The lineal movement is transferred through the roller 244 to the pin 248 and into the pair of arms 240 of the yoked end portion 238 of the follower mechanism 230. From the yoked end portion 238, the lineal movement is transferred to the body 232 and to the collar portion 234 of the follower mechanism 230. The lineal movement is transferred from the collar portion 234 to the first end portion 202 of the shaft 200. The first end portion 202 of the shaft 200 transfers the lineal movement to the collar portion 210 and the second abutting surface 218 applies the resulting force to the spring 222. The resistance of the spring 222 is overcome by the resulting force and the lineal movement of the shaft 200 continues. Thus, the spherical end 206 of the shaft 200 being connected to the spherical receiving end 162 of the rigid member causes lineal movement of the rigid member 154. And, the forked end 156 of the rigid member 154 being connected to the tang 127 of the valve 120 by the pin 160 causes lineal movement of the valve 120. The result being the valve 120 moves lineal between the maximum flow position 122 and the minimum flow position 124.

The spring 222 biases the follower mechanism 230 into friction engagement with the respective one of the plurality of cam portions 56. And, the pin 226 positioned in the slot 190 of the housing member 170 and attached in the blind bore 214 in the shaft 200 prevents the shaft 200 from rotating. Thus, the follower mechanism 230 is maintained in alignment with the cam profile 140 of the cam portion 56.

Furthermore, the shielding member 260 protects the shaft 200 from becoming too hot and effecting the operation of the shaft 200 within the housing member 170. For example, too much heat will cause the shaft 200 to grow and possibly bind or stick within the small diameter 186 of the housing member 170. Such, binding or sticking could prevent the effective lineal movement and control of the responsiveness of the valve 120 movement within the passage 114 between the maximum flow position 122 and the minimum flow position 124. Additionally, the shielding member 260 resists the transfer of heat to the follower mechanism 230.

The existing control system 50 modulates the fluid flow 24 through the plurality of injectors 40. The control system 50 efficiently controls emissions without incurring an increase in operational cost caused by water or steam injection. The fluid flow 24 is either used for combustion or for cooling of gas turbine engine components. The present control improves the emissions emitted from the engine exhaust in an effective and efficiently manner.

Other aspects, objects and advantages of this invention can be obtained from a study of the drawings, the disclosure and the appended claims.

I claim:

1. A control system being adapted for use with a gas turbine engine, said gas turbine engine defining a central axis having a housing thereabout, a compressor section forming a fluid flow, a combustor section and a turbine section having a spent fluid flowing therefrom, each being operatively connected one to the other, said control system comprising:

a plurality of sensors, a portion of said plurality of sensors being positioned in the spent fluid and sensing a constituent of said spent fluid, and an additional portion of said plurality of sensors being positioned within said gas turbine engine and sensing a parameter of said gas turbine engine;

a monitor being operatively connected to said plurality of sensors and receiving a signal therefrom, said monitor interpreting said signal;

a plurality of fuel injectors being positioned within said combustor section, each of said plurality of fuel injectors defining a passage therein through which a portion of said fluid flow being passed from said compressor section to said combustor section, a valve being positioned within said passage and being lineal movable between a maximum flow position and a minimum flow position;

a plurality of lineal movement portions each defining a first end portion and a second end portion, said second end portion being attached to said respective valve of said plurality of fuel injectors, each of said plurality of lineal movement portions including a housing member interposed said first end portion and said second end portion and being attached to said housing, a shielding member positioned between said housing member and said valve near said second end portion and a follower mechanism being positioned at the extremity of said first end portion;

a plurality of cam portions being connected to a respective one of said follower mechanism of said plurality of lineal movement portions, each of said plurality of cam portions including a rotating member having a cam profile being operatively connected to a respective one of said follower mechanism of said plurality of lineal movement portions;

a ring gear being connected to each of said plurality of cam portions, said ring gear actuating each of said plurality of cam portions simultaneously; and a actuating mechanism being operatively connected to said monitor, receiving a signal from said monitor, actuating said ring gear and lineally moving said respective valve between said maximum flow position and said minimum flow position.

2. The control system of claim 1 wherein said constituent being sensed by said portion of said plurality of sensors is CO.

3. The control system of claim 1 wherein said constituent being sensed by said portion of said plurality of sensors is NOx.

4. The control system of claim 1 wherein said gas turbine engine parameter being sensed by said portion of said plurality of sensors is speed.

5. The control system of claim 1 wherein said gas turbine engine parameter being sensed by said portion of said plurality of sensors is temperature.

6. The control system of claim 1 wherein said monitor is a computer.

7. The control system of claim 1 wherein said plurality of fuel injectors are of the gaseous fuel type.

8. The control system of claim 1 wherein said plurality of fuel injectors are of the liquid fuel type.

9. The control system of claim 1 wherein said plurality of fuel injectors are of the duel fuel type.

10. The control system of claim 1 wherein each of said plurality of lineal movement portions includes a rigid member positioned at the second end portion and being attached to said valve.

11. The control system of claim 10 wherein each of said plurality of lineal movement portions further include a shaft being movably positioned within said housing member and said rigid member includes a spherical receiving end being attached to a spherical end of said shaft.

12. The control system of claim 11 wherein said shaft includes a first end portion being opposite the spherical end and connected to said follower mechanism, a collar portion being positioned between said first end portion and said spherical end and each of said plurality of lineal movement portions including a spring interposed said collar portion and said housing member.

13. The control system of claim 12 wherein said spring biases said follower mechanism into friction engagement with said respective one of said plurality of cam portions.

14. The control system of claim 1 wherein said shielding member defines a first end portion being attached to the housing member and a second end portion includes a sealing member.

15. The control system of claim 14 wherein said shielding member further includes a heat dissipating member interposed the sealing member and the housing member.

16. The control system of claim 1 wherein said housing member of each of said plurality of lineal movement portions includes a bore having a stepped configuration located within said housing member, said stepped configuration defining a shoulder and said housing member having a shaft positioned within said bore, said shaft having a collar portion defining an abutting surface, and a spring being interposed said abutting surface and said shoulder.

17. The control system of claim 16 wherein said housing member of each of said plurality of lineal movement portions further includes a slot therein defining an elongate portion being parallel with the bore in said housing member and said collar portion defining an outer surface having a blind bore therein, a pin being positioned in the blind bore and being slidably positioned within said slot.

* * * * *